United States Patent
Bassi et al.

(10) Patent No.: US 7,239,360 B2
(45) Date of Patent: Jul. 3, 2007

(54) SHORT THROW PROJECTION SYSTEM AND METHOD

(75) Inventors: Zorawar S. Bassi, Markham (CA); Gregory Lionel Smith, Toronto (CA); Louie Lee, Richmond Hill (CA)

(73) Assignee: Silicon Optix Inc., San Jose, CA (US)

( * ) Notice: Subject to any disclaimer, the term of this patent is extended or adjusted under 35 U.S.C. 154(b) by 458 days.

(21) Appl. No.: 10/459,426

(22) Filed: Jun. 12, 2003

(65) Prior Publication Data

US 2003/0231261 A1    Dec. 18, 2003

Related U.S. Application Data

(60) Provisional application No. 60/387,597, filed on Jun. 12, 2002.

(51) Int. Cl.
*H04N 9/28* (2006.01)

(52) U.S. Cl. .................................................. 348/745

(58) Field of Classification Search ........ 348/744–747; 353/69–70, 79
See application file for complete search history.

(56) References Cited

U.S. PATENT DOCUMENTS

| | | | |
|---|---|---|---|
| 5,185,667 A | | 2/1993 | Zimmermann |
| 5,319,744 A | * | 6/1994 | Kelly et al. ................. 345/647 |
| 5,394,198 A | | 2/1995 | Janow |
| 5,422,691 A | | 6/1995 | Ninomiya et al. |
| 5,622,418 A | | 4/1997 | Daijogo et al. |
| 5,634,704 A | | 6/1997 | Shikama et al. |
| 5,671,993 A | | 9/1997 | Shikama |
| 5,760,875 A | | 6/1998 | Daijogo et al. |
| 5,973,848 A | | 10/1999 | Taguchi et al. |
| 6,233,024 B1 | | 5/2001 | Hiller et al. |
| 6,392,821 B1 | * | 5/2002 | Benner, Jr. ................. 359/727 |
| 6,461,001 B2 | | 10/2002 | Okamori et al. |
| 6,467,910 B1 | * | 10/2002 | Sato ............................. 353/84 |
| 6,498,620 B2 | | 12/2002 | Schofield et al. |

(Continued)

FOREIGN PATENT DOCUMENTS

CA    2 381 093    2/2001

(Continued)

*Primary Examiner*—Paulos M. Natnael
(74) *Attorney, Agent, or Firm*—Sughrue Mion, PLLC

(57) ABSTRACT

A short throw projection system and method for displaying a corrected optical image on a projection screen based on input image data that includes an electronic correction unit, an image projector and a reflection assembly. The electronic correction unit receives the input image data and generates pre-distorted image data. The image projector receives the pre-distorted image data from the electronic correction unit and projects a pre-distorted optical image that corresponds to the pre-distorted image data or a pre-distorted image compensated by the projection optic distortion. The optical reflection assembly is positioned in the optical path of the pre-distorted optical image to project an optical image on the projection screen. The reflection assembly can consist of various combinations of curved and planar mirrors as desired. The electronic correction unit is encoded to pre-distort the geometry of the image represented by the image data such that when the pre-distorted optical image is projected through the image projector and reflected within the reflection assembly, the optical and geometric distortions associated with the image projector and the mirrors within the reflection assembly are eliminated in the displayed optical image.

40 Claims, 11 Drawing Sheets

U.S. PATENT DOCUMENTS

| | | |
|---|---|---|
| 6,520,646 B2 * | 2/2003 | Rodriguez et al. ............ 353/69 |
| 6,561,649 B1 | 5/2003 | Burstyn |
| 6,568,814 B2 * | 5/2003 | Rodriguez et al. ............ 353/69 |
| 6,631,994 B2 * | 10/2003 | Suzuki et al. ................. 353/77 |
| 6,795,255 B2 * | 9/2004 | Reinecke et al. ........... 359/755 |
| 6,898,308 B2 * | 5/2005 | Mojsilovic et al. ......... 382/162 |
| 2001/0050758 A1 | 12/2001 | Suzuki et al. |
| 2001/0050812 A1 | 12/2001 | Takahashi et al. |
| 2002/0024636 A1 | 2/2002 | Okamori et al. |
| 2002/0154418 A1 | 10/2002 | Shikama |

FOREIGN PATENT DOCUMENTS

| | | |
|---|---|---|
| CA | 393 022 | 4/2002 |
| EP | 1 205 791 A1 | 5/2002 |
| JP | 03-241331 | 10/1991 |
| JP | 11-146307 | 5/1999 |

* cited by examiner

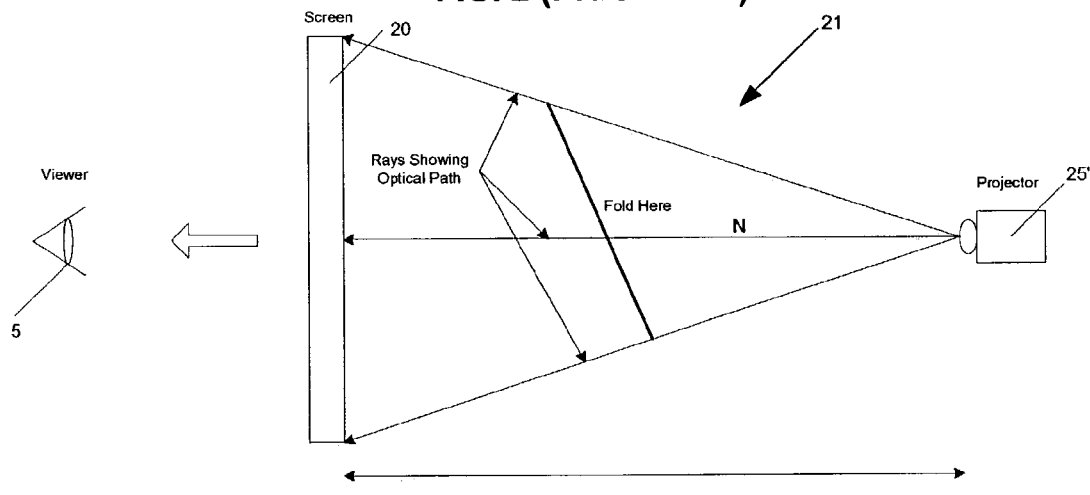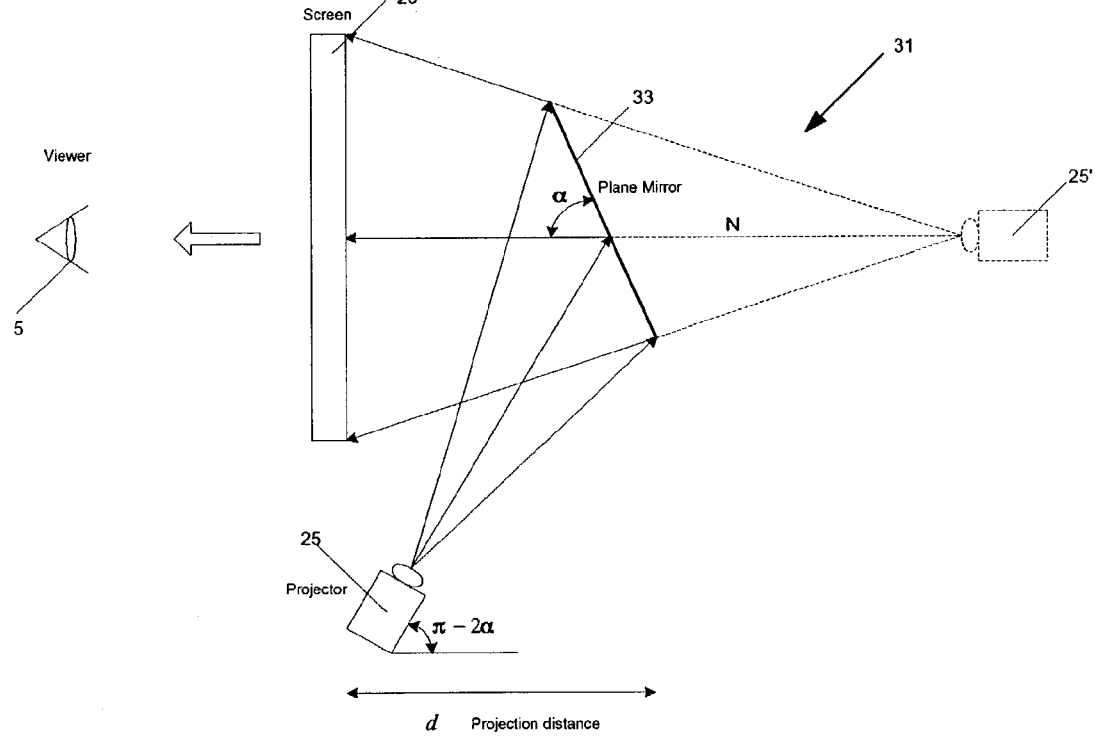

FIG. 3 (PRIOR ART)
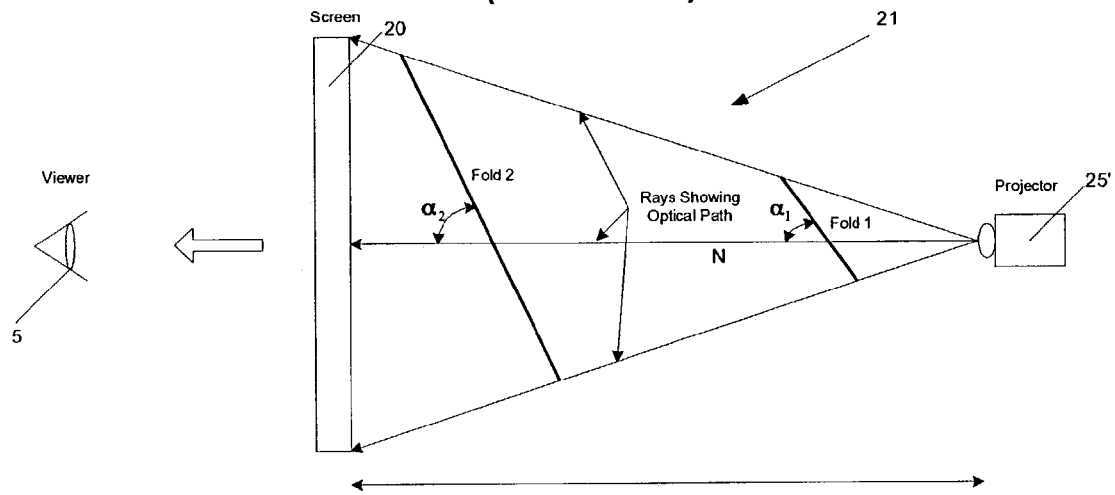
Rear Projection System
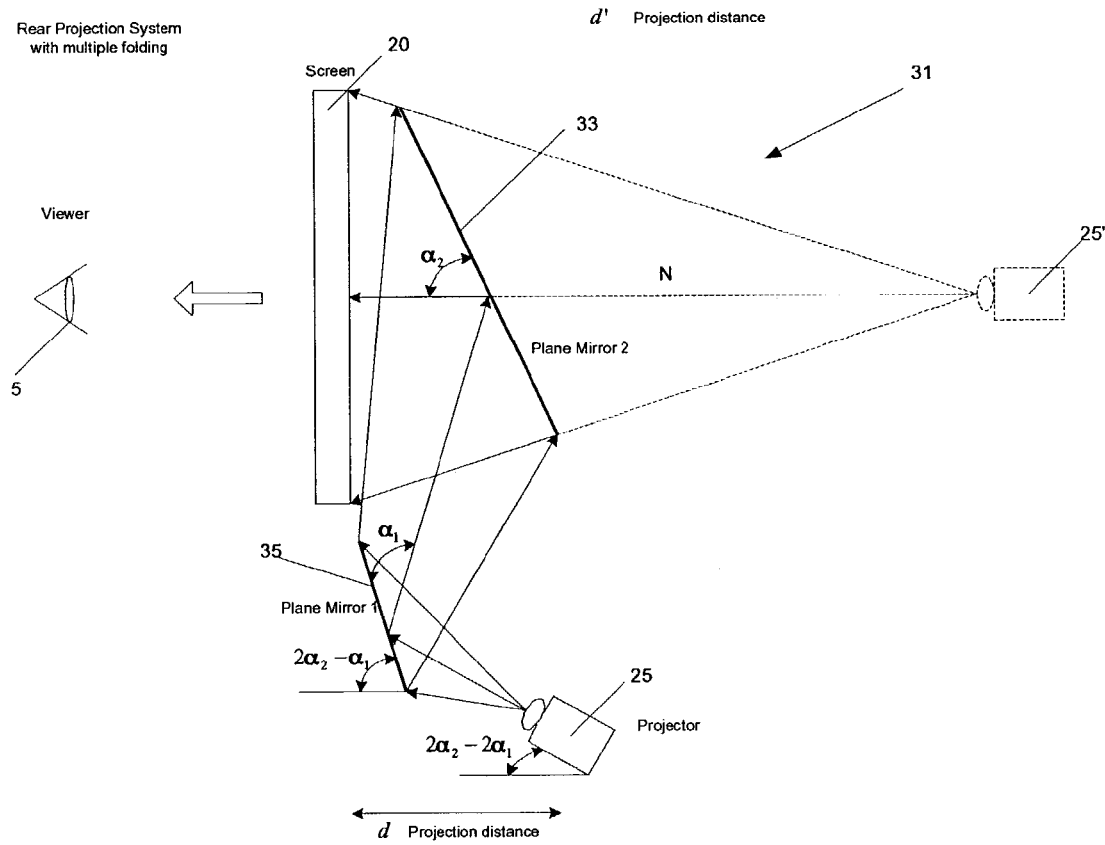
Rear Projection System with multiple folding

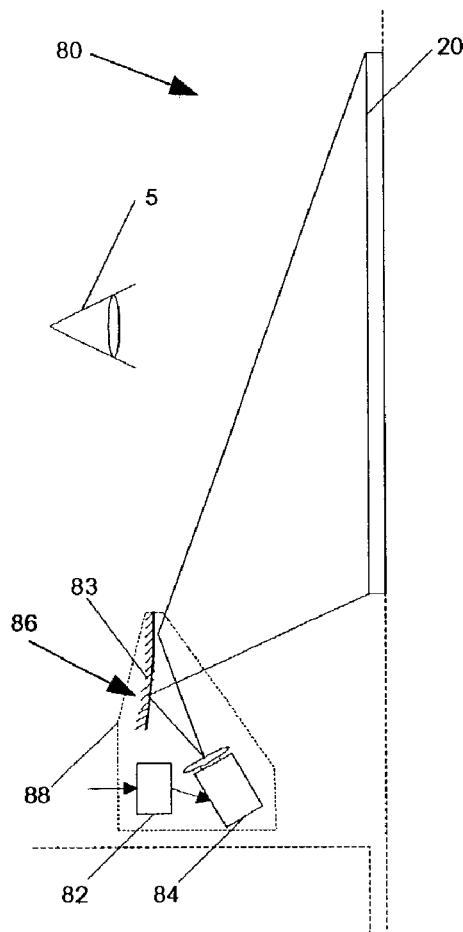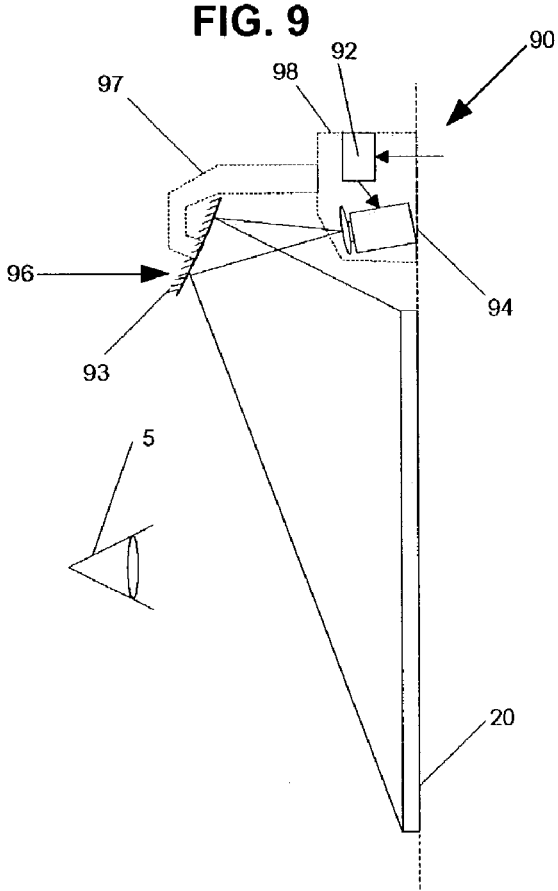

Application of convex hyperbolic/hyperboloid mirror

Application of concave hyperbolic/hyperboloid mirror

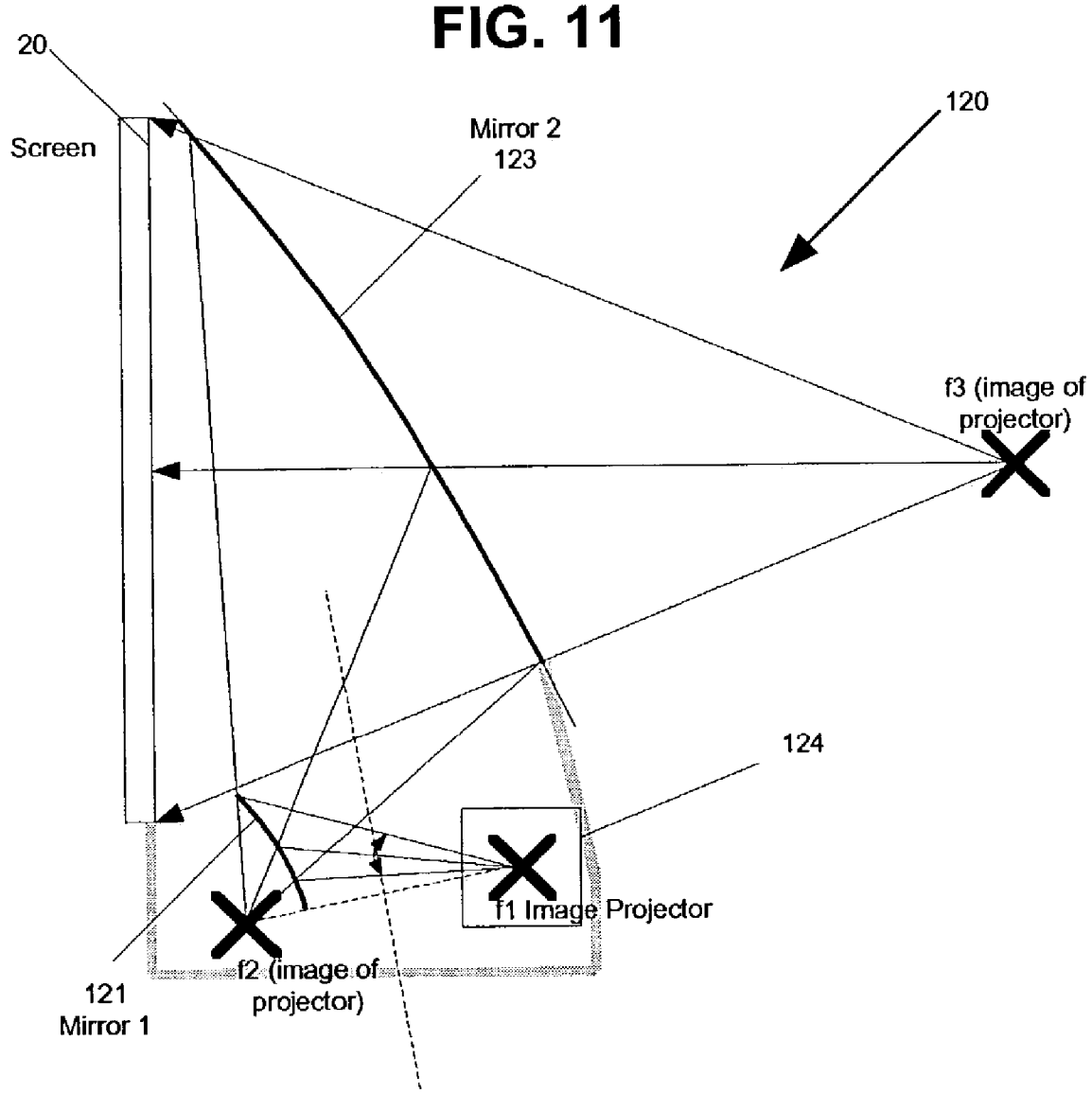

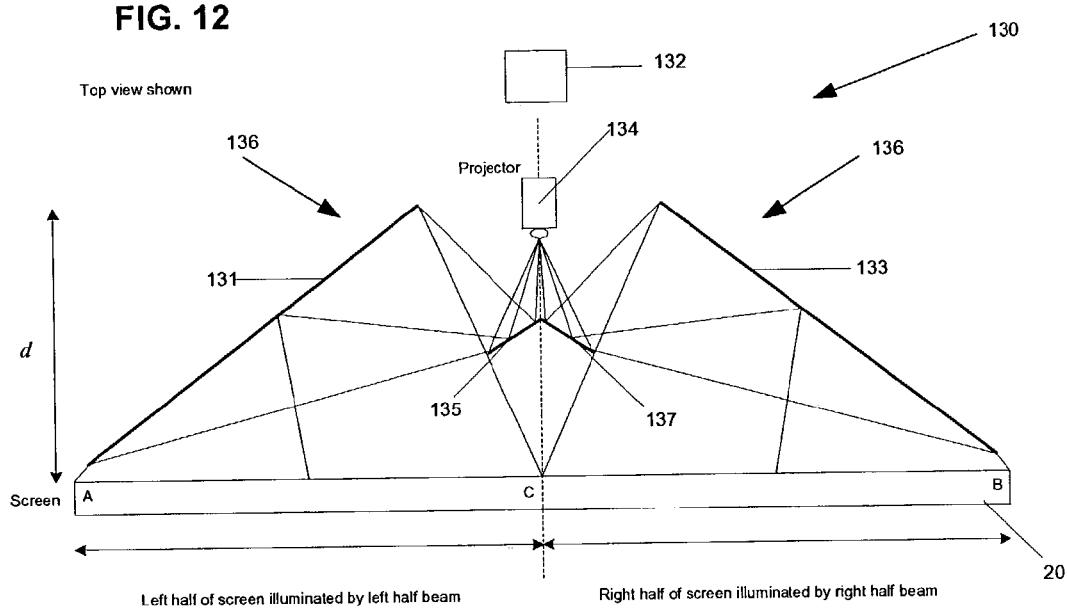
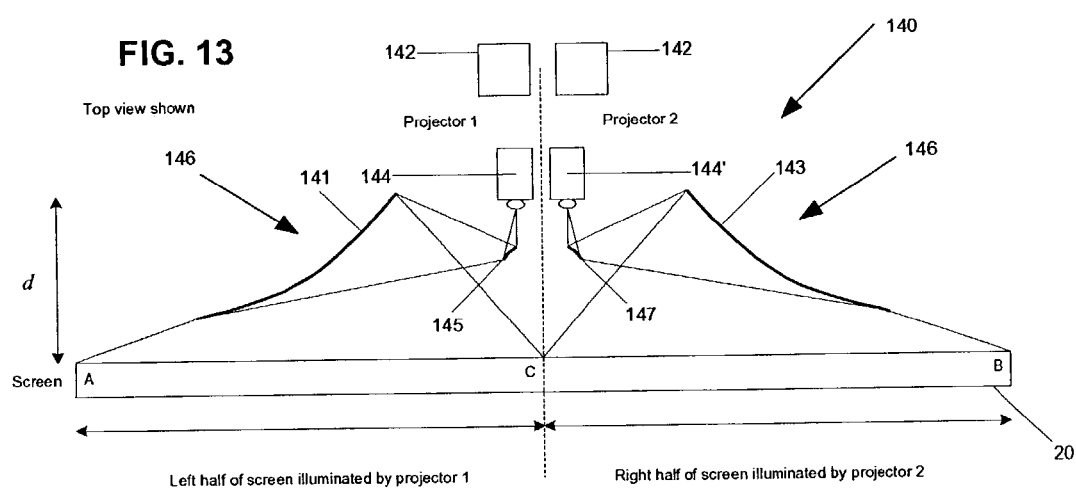

SHORT THROW PROJECTION SYSTEM AND METHOD

This application claims the benefit under 35 U.S.C. 119(e) of U.S. Provisional Application No. 60/387,597, filed Jun. 12, 2002.

FIELD OF THE INVENTION

This invention relates to projection systems and methods and more particularly relates to a short throw projection system and method.

BACKGROUND OF THE INVENTION

A general projection system may be classified as front projection based or rear projection based depending on the positions of the viewer and projector relative to the screen. In a front projection system, the viewer and projector are on the same side of the screen, with the image from the projector reflecting off the screen to the viewer. In a rear projection system, the projector and viewer are on opposite sides of the screen, with the image from the projector being "transmitted through" the screen to the viewer.

FIG. 1 shows a prior art rear projection system 21 and a prior art front projection system 23. As shown, the image projectors 25 can be placed at different positions in respect of the screen 20. The throw ratio is given by the projection distance, d, divided by the screen diagonal length D, or:

$$\text{Throw Ratio} = \frac{d}{D} \qquad (1)$$

A common design goal in building any projection system is to minimize the throw ratio, without sacrificing image quality. As discussed, the throw ratio is defined as the ratio of the distance from the screen of the farthest optical element (often the projector) to the size of the projected image as given by the image/screen diagonal. Minimizing the throw ratio is especially important for rear projection systems in which the projector and screen are physically combined into a single functional unit, such as rear projection televisions. In such units minimizing the throw ratio implies a smaller cabinet depth, which houses the screen and projector. Minimizing the throw ratio of front projectors also provides other important advantages, such as the ability to locate a projector close to screen surface allows ease of placement and avoids interference of the light path by presenters or audience.

To decrease the throw ratio, prior art methods have combined planar mirrors with low distortion and wide field of view (FOV) lenses to fold the optical path, which serves to decrease the projection distance, hence decreasing the throw ratio. By fine-tuning the optical geometry (lens type, focal distances, mirror angles), it can be assured that image distortions are minimized. This has the disadvantages of requiring optical elements that are difficult to design and expensive to manufacture and restricting the sizes/placement of the optical elements. The optical and geometric constraints manifest as pincushion or barrel distortion and keystone distortions. The design of prior art systems have largely been constrained by the requirement of minimizing distortions.

More recently curved mirrors have been used, along with a computational circuit that serves to eliminate distortions such as in U.S. Pat. No. 6,233,024 to Hiller et al. However, the invention disclosed in U.S. Pat. No. 6,233,024 is restricted to optimizing only rear projection systems with constraints (due to minimizing distortion), though reduced, still lingering. Further, the mirror orientation angles are constrained to a certain range and confined to a single projector system. Finally, U.S. Pat. No. 6,233,024 is based on a projection mechanism that generates an image on a screen using scanning laser light bundles, where the computational circuit controls the deflection and intensity of the light bundles, which is a cumbersome and inflexible arrangement that provides limited fine-tuning of the data.

Current CRT based projection systems generate images in a raster scan format controlled electronically by horizontal and vertical deflection circuits. These deflection circuits incorporate compensation circuits that generate non-linear deflection control signals to compensate for the non-linearity between deflection angle to display surface scanned area. This distortion results in the display of a pincushion image. Typically, the compensation circuits can be adjusted to also compensate for distortion of lenses or other distortion anomalies in the projection system. For newer generations of projection systems employing fixed matrix displays, specifically microdisplays, such a compensation method cannot be accommodated. In addition, a projection system utilizing microdisplay(s) requires an optical magnification of approximately 100 times to illuminate an image of 60–70 inches. This requires high tolerance in alignment and calibration of the projection optics in production and adjustments due to misalignment from shipping and aging.

Finally, inherent in any wide angle and off-axis projection system, is the large variation in optical path within the optical envelope. This and other optical component anomalies (e.g. light source, display devices, lenses, etc.) can result in the projected image having uneven luminance as well as uneven chrominance. As well, the differences in refraction of light color can introduce significant divergence in the image colors.

SUMMARY OF THE INVENTION

The invention provides in one aspect, a projection system for displaying a distortion corrected optical image on a projection screen based on input image data, comprising:

(a) an electronic correction unit for receiving the input image data and generating pre-distorted image data;

(b) an image projector coupled to the electronic correction unit for receiving the pre-distorted image data and providing an pre-distorted optical image that corresponds to the pre-distorted image data;

(c) said electronic correction unit being adapted to pre-distort the geometry of the input image data such that when said pre-distorted optical image based on said pre-distorted image data provided through the image projector, the optical, geometric, and alignment distortions associated with said image projector are eliminated in the displayed optical image; and (d) said electronic correction unit being further adapted to independently pre-distort the geometry of each primary color represented by the input image data and generate a pre-distorted primary color image data to compensate for differences in the optical refraction of each color, such that when the pre-distorted primary color image associated with the pre-distorted primary color image data is projected through the image projector to the projection screen, the optical and geometric distortions associated with each primary color optical image are eliminated.

The invention provides in another aspect, a projection method for displaying a distortion corrected optical image on a projection screen based on input image data, comprising:

(a) receiving input image data and generating pre-distorted image data;

(b) providing a pre-distorted optical image through an image projector, said pre-distorted optical image corresponding to the pre-distorted image data;

(c) wherein (a) further consists of pre-distorting the geometry of the input image data such that when said pre-distorted optical image based on said pre-distorted image data is provided through the image projector, the optical, geometric, and alignment distortions associated with the image projector and the reflection assembly are eliminated in the displayed optical image; and (d) independently pre-distorting the geometry of each primary color represented by the input image data to compensate for difference in optical refraction of each color, such that when the pre-distorted primary color image associated with the pre-distorted primary color image data is projected through the image projector to the projection screen, the optical and geometric distortions associated with each primary color optical image are eliminated.

The invention enables the implementation of extremely short throw projection and uses digital image processing circuits to compensate for non-linear two-dimensional distortion that is inherent in very wide angle and in non-planar mirrors. The digital image processing circuits also provide the capability to compensate for lateral chromatic aberration and for component tolerance and system alignment induced distortions. These inherent two-dimensional distortions are generally difficult and expensive to optically correct.

Further aspects and advantages of the invention will appear from the following description taken together with the accompanying drawings.

BRIEF DESCRIPTION OF THE DRAWINGS

In the accompanying drawings:

FIG. 2 is a schematic diagram of a prior art rear projector, illustrating how the optical path can be folded using a single planar mirror;

FIG. 3 is a schematic diagram of a prior art rear projector, illustrating how the optical path can be folded using two planar mirrors;

FIG. 8 is a schematic diagram of another example configuration of the projection system of FIG. 4 as a desktop front projection system that uses a convex mirror;

FIG. 9 is a schematic diagram of another example configuration of the projection system of FIG. 4 as a front projection system with retractable reflection optics;

FIG. 11 is a schematic diagram of another example configuration of the projection system of FIG. 4 as a two-fold rear projection system that uses a convex mirror and a concave mirror in sequence;

FIG. 12 is a schematic diagram of another example configuration of the projection system of FIG. 4 showing how the light beam from a single projector can be split into two optical paths where each half beam can be used to separately illuminate half of the screen; and FIG. 13 is a schematic diagram of another example configuration of the projection system of FIG. 4 that shows how two image projectors can be used to form half of the image by concatenating two rear projection systems.

DETAILED DESCRIPTION OF THE INVENTION

Figure 1:
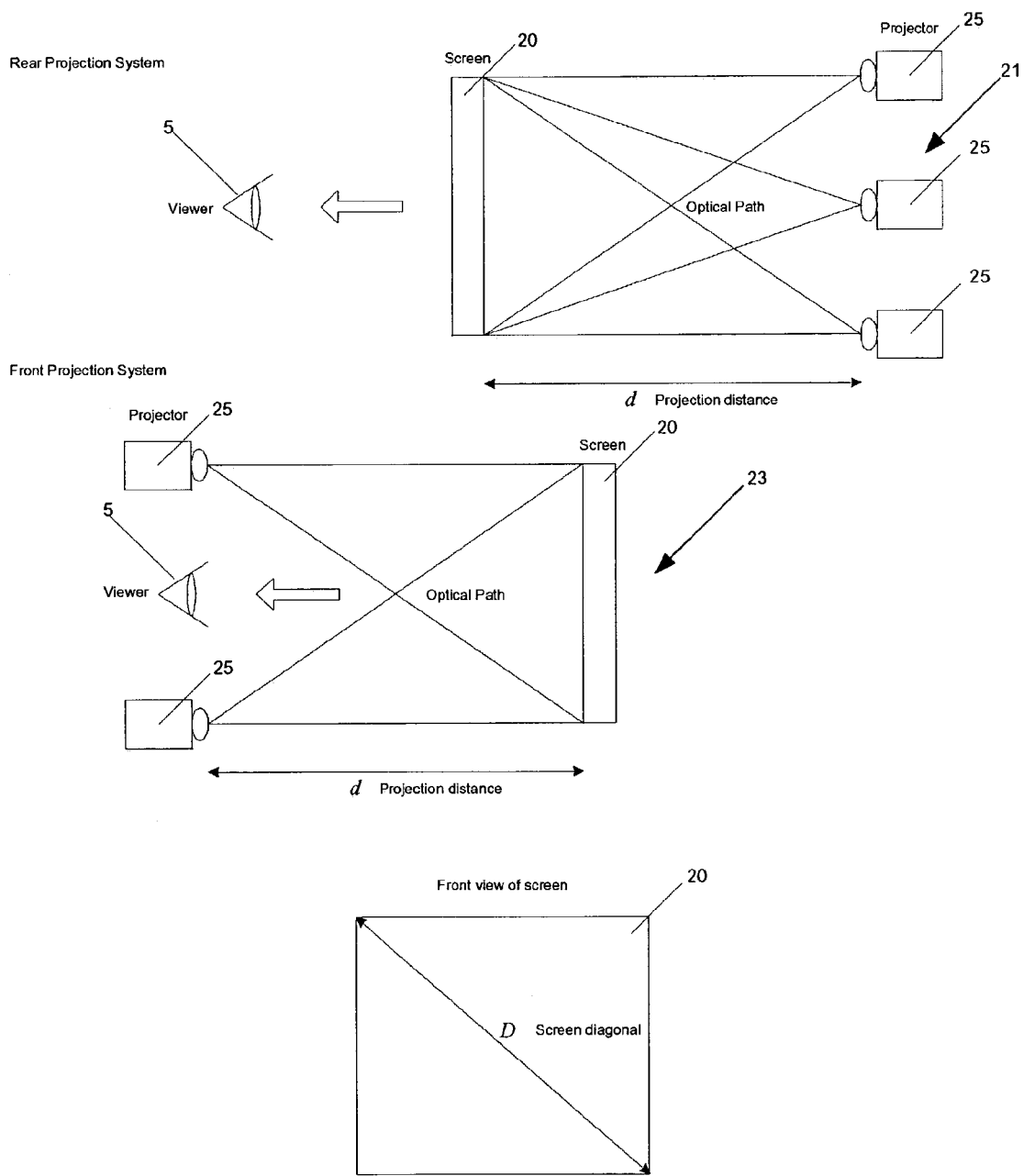
FIG. 1 is a schematic diagram of a prior art rear projection system and a prior art front projection system.

FIGS. 2 and 3 show typical prior art rear projection systems 21 with conceptual fold(s) and prior art rear projection systems 31 that use optical path folding to reduce the projection distance d and accordingly the throw ratio.

As shown in FIG. 2, a single fold arrangement is shown where image folding is achieved by using a planar mirror 33 to reflect the light path from projector 25 to screen 20. Specifically, the result of single folding is that projector 25 can be placed in front of plane mirror 33 with the same effect as if projector 25 was positioned as projector 25'. This arrangement results in the reduction of the projection distance (i.e. distance d instead of the distance d' associated with the non-folded arrangement). As shown, a fold at a distance of d/s from the screen (s>1) will reduce the throw ratio by s. Provided the angles of the mirror(s) and the projector are chosen correctly, the image should be displayed free of any distortions. The single folding arrangement shown requires a certain configuration of plane mirror 33 and projector 25. Specifically, if the angle between the surface of plane mirror 33 and the normal projection line N is a then projector 25 should be positioned at an angle of $\pi-2\alpha$ from the normal projection line N such that the image projected by projector 25 reaches plane mirror 33 at the correct angle, as shown.

As shown in FIG. 3, multiple folding can also be achieved by using two planar mirrors 33 and 35. Again, a fold at a distance of d/s from the screen (s>1) will reduce the throw ratio by s. Provided the angles of the mirror(s) and the projector are chosen correctly, the image should be displayed free of any keystone distortions. The double folding arrangement shown requires a certain configuration of plane mirrors 33, 35 and projector 25. Specifically, if the angle between the surface of plane mirror 33 and the normal projection line N is $\alpha_2$ and plane mirror 35 is positioned at an angle of $2\alpha_2-\alpha_1$ from normal projection line N, then projector 25 should be positioned at an angle of $2\alpha_2-2\alpha_1$ from the normal projection line N such that the image projected by projector 25 reaches plane mirror 35 at the correct angle and such that the image reflected by mirror 35 reaches plane mirror 33 at the correct angle for complete reflection on projection screen 20, as shown.

As conventionally known, any lens distortions or focus problems would be corrected optically by adjusting the positioning of the projection optical components. Also, as conventionally known, the mirror/projector arrangement and lens types are constrained by the requirement that the final image be distortion-free. It should be understood that many other mirror configurations are possible and that while these arrangements have been shown in association with rear projection systems, corresponding arrangements can be utilized in respect of front projection systems.

Figure 4:
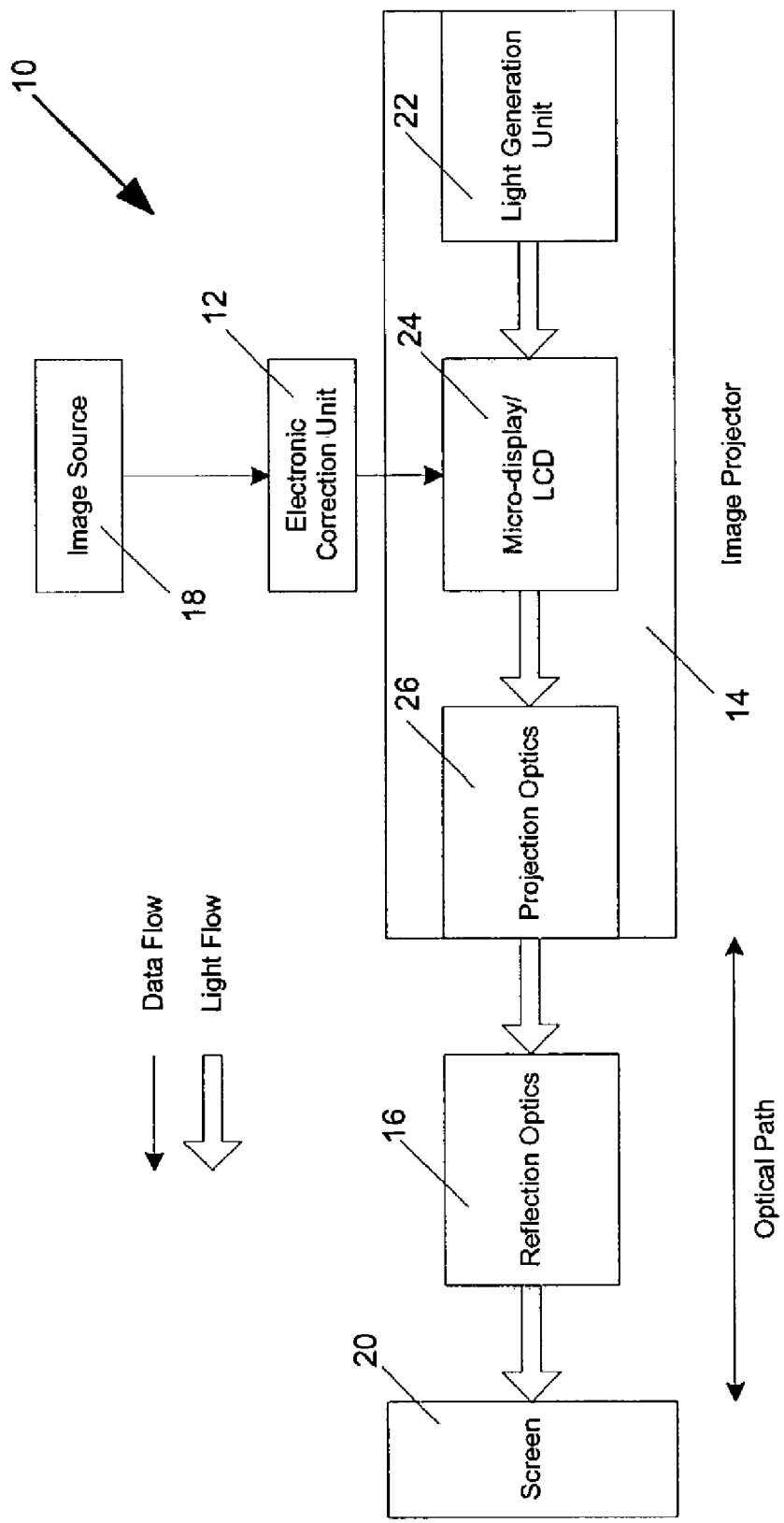
FIG. 4 is a block diagram of an example configuration of the projection system of the present invention.

FIG. 4 illustrates a projection system 10 built in accordance with the present invention. Projection system 10 comprises an electronic correction unit 12, an image projector 14, and reflection assembly 16 which transforms image data representing an input image provided by image source 18 into a pre-distorted optical image for projection onto a projection screen 20 such that the displayed optical image is a non-distorted image.

Image source 18 can be a video source from broadcast receiver, video recorder, camera, a personal computer, or any other device capable of producing an image in the required video/graphics format (e.g. YprPb, RGB, DVI, etc.)

Electronic correction unit 12 receives input image data from image source 18 and digitally warps, or pre-distorts, the input image data in accordance with distortion descriptor data, such that when the pre-distorted image data is projected by the image projector 14 through the reflection optics 16, the optical image displayed on projection screen 20 is distortion free. Electronic correction unit 12 contains separate circuits (not shown) to process each primary color in the image data separately or uniformly to correct for any color dependent distortions and brightness non-uniformity in the displayed optical image as will be further described. Electronic correction unit 12 applies electronic correction to the digital image data that is provided to image projector 14 allowing for digital fine-tuning of the data. The specific workings of electronic correction unit 12 will be discussed in more detail.

Image projector 14 receives the pre-distorted image data from electronic correction unit 12 and generates a pre-distorted optical image that corresponds to the pre-distorted image data modified by any optical distortion of the projection optics 26. Image projector 14 contains light generation unit 22, a micro-display device 24 and projection optics 26. Light generation unit 22 includes components (not shown) such as a light source (e.g. lamp or laser), color separation prisms and an integrator/collimator (not shown). Micro-display device 24 can be any commercially available micro-display hardware (e.g. an LCD, CRT, DLP™, LCOS, etc.) and is used to generate an optical image by reflecting/transmitting the light according to the pre-distorted digital image data generated by the electronic correction unit 12. It should be understood that multiple micro-display devices 24 could be used instead of a single one to facilitate independent color correction within the input image as will be discussed. Projection optics 26 consists of lenses that project and focus the pre-distorted image through the reflection optics 16 onto the projection screen 20.

Projection optics 26 may consist of wide angle lenses, or lenses to reduce astigmatism. Also, the projection angle of projection optics 26 may be of normal or wide field of view (FOV) and when reflected on a curve mirror is expanded to a wider FOV. Projection optics 26 can be of sufficient FOV that only require a planar mirror to provide the required FOV to achieve the throw ratio. The invention does not require projection optics 26 to be distortion free as any distortions in projection optics 26 and curved mirrors are corrected by digital image processing. The design of projection optics 26 can be directed towards reducing astigmatism or towards improving focus quality within the depth of field of the projection screen 20.

Reflection assembly 16 receives the light beam from image projector 14 that contains the pre-distorted optical image. Reflection assembly 16 consists of curved and/or planar mirrors that are arranged to fold the optical path and which are configured in a manner to largely reduce the throw ratio, as discussed above, but also to minimize overscan of the screen and thus loss of resolution. Variations in throw ratios can be obtained by combining several mirrors, such as convex and concave curved mirrors alone or in combination with plane type mirrors, as will be discussed in detail.

Accordingly, projection system 10 provides for distortion-free projection of an optical image through the use of particularly configured projection elements. Further, it should be understood that projection system 10 can be configured to operate in either a front projection arrangement or in a rear projection arrangement. Finally, when "distortion-free" is used, it should be understood that this term refers to various types of geometric distortions such as keystone, tilt, pincushion/barrel, and other non-linear effects, and not focus problems such as astigmatism.

Figure 5:
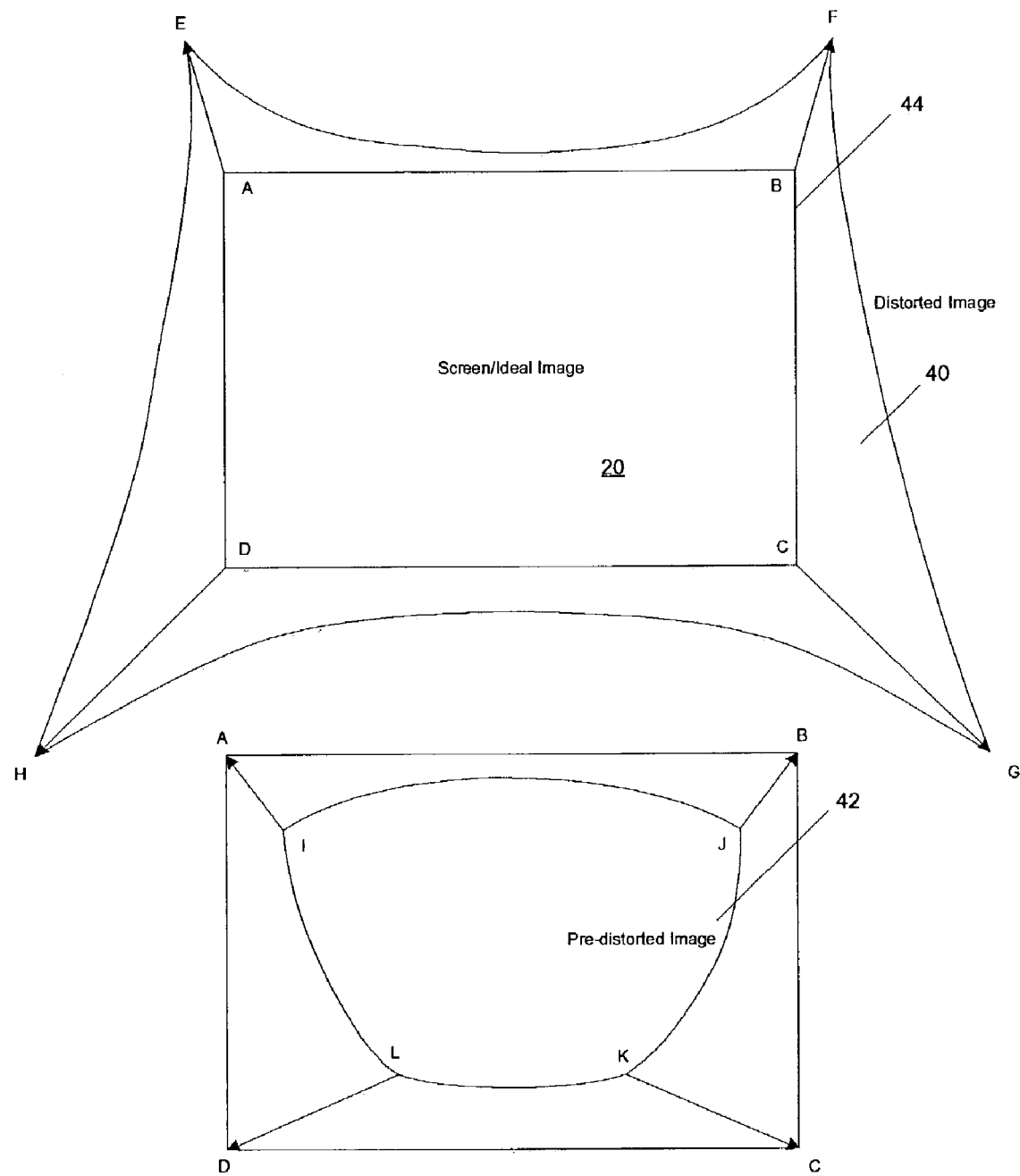
FIG. 5 is a schematic diagram of a distorted image after reflection from a curved mirror and an example of a pre-distorted image that would correct the distortion.

Referring now to FIGS. 4 and 5, electronic correction unit 12 is used to geometrically pre-distort an input digital image in such a manner that the displayed optical image displayed is distortion-free.

FIG. 5 provides an example of a distorted image 40 that results from the reflection of an ideal image 44 in a curved mirror (not shown). Also shown is a pre-distorted image 42 that, when reflected in a curved mirror, will correct or compensate for the distortion caused by the curved mirror and result in ideal image 44 to be projected on projection screen 20. That is, when pre-distorted image 42 is reflected in a curved mirror, ideal image 44 will be projected on projection screen 20. Specifically, in the absence of any correction, the ideal image ABCD will display on projection screen 20, as the curved "trapezoid" EFGH, with the corner/boundaries mapped as shown. By pre-distorting the image in the inverse manner, as shown by the "trapezoid" IJKL, the final image displayed will match exactly the screen ABCD and accordingly, be distortion free.

Projection system 10 uses electronic correction unit 12 to pre-distort the input image according to geometric transformations that are the inverse of the geometric distortions introduced by the projector (not shown) and the associated reflection (mirror) optics (not shown). If the full distortion achieved within projection system 10 (due to lenses/mirrors) is represented by the transformation F, then the image is pre-distorted according to $F^{-1}$, and the following relation exists:

$$\text{Displayed Image} = F(F^{-1}(\text{Input Image})) = \text{Input Image} \quad (2)$$

Accordingly, electronic correction unit 12 essentially "frees" the system of constraints associated with the requirements for a distortion-free displayed image. The ability to digitally correct distortions means that the optical geometry and the optical elements (such as angles, types of the mirror(s) and lenses, etc.) can be varied as needed for particular design objectives. Without geometric correction, distortions within the displayed image will result due to the various optical processing steps. The pre-distortion applied by the electronic correction unit 12 is essentially a re-sampling/filtering of the input image data. The pixels are re-sampled according to $F^{-1}$, which gives the geometric transformation that the pixel positions undergo. The transformation $F^{-1}$ can be determined from the spatial transforming properties of the various optical elements. The specifics of the electronic correction unit, will determine the format in which $F^{-1}$ needs to be specified (e.g. in terms of 2D surfaces, 1D polynomials, etc.)

Due to optical refraction, light of different color has a different spatial transform as it passes through projection optics 26 of image projector 14. If this is not corrected, lateral chromatic aberrations can result. As discussed, light generation unit 22 (FIG. 4) includes color separation prisms (not shown) and an integrator/collimator (not shown) to provide three separate color light streams. Micro-display device (or devices as will be described) 24, are positioned in front of the light separator (not shown) located within light generation unit 22. As previously noted, the light separator located within light generation unit 22 separates the light beam into separated primary color light streams. The associated micro-display device (or devices) 24 then modulate the separated primary color light streams with pre-distorted primary color image data that is provided by the circuit (or circuits as will be described) of electronic correction unit 12. In this way, it is possible to perform correction of lateral chromatic aberrations within the projected image on projection screen 20. Also, it is possible to modify the image brightness associated with the input image data can at micro-display device 24 such that brightness variations due to characteristics of the optical components, projection path and the display device can be compensated for.

It should be understood that by time multiplexing the image data color signals, a single micro-display device 24 can be used. However, optionally a plurality (i.e. a "triple") of micro-display devices can be used in place of a single micro-display device 24. Where multiple micro-display devices 24 are used, each micro-display device 24 is provided with the unique pre-distorted image data that associated with a particular color (e.g. red, blue, green). That is, each of the micro-display devices 24 is adapted to modulate the separated primary color light streams from light generation unit 22 with the appropriate pre-distorted primary color image data that is provided by the circuit (or circuits as will be described) of electronic correction unit 12. In this way, it is possible to perform correction of lateral chromatic aberrations within the projected image on projection screen 20. Also, in the case of multiple micro-display devices 24, the image brightness associated with the input image data can be modified at each individual micro-display display device 24 such that brightness variations due to characteristics of the optical components, projection path and the display device can be compensated for.

Finally, the three image data color signals (e.g. red, blue and green) can be time multiplexed (i.e. provided sequentially) to electronic correction unit 12 through a single circuit within electronic correction unit 12. However, electronic correction unit 12 can optionally use multiple (i.e. a "triple") separate circuits (not shown) for individually processing the geometry of each primary colors of the image data independently or uniformly as needed. While the use of multiple (i.e. "triple") circuits is not efficient where only one micro-display device 24 is used, it may be desirable for compatibility reasons (i.e. in situations where it is desired to be compatible with a single or a triple micro-display device 24).

Electronic correction unit 12 is also used to correct for brightness non-uniformity or luminance non-uniformity. Displayed image on projection screen 20 may have brightness variations due to limitations of the image projector components (e.g. light generation unit, etc.) or due to properties of the optical path. In particular, points or sections illuminated on projection screen 20 can be simultaneously associated with varying optical paths. This means that the light responsible for different screen points or sections of the displayed image can come from various sources and travel different distances. Since intensity of a point or section of the displayed image varies inversely with the square distance, this leads to brightness variations within the displayed image. Electronic correction unit 12 is used to pre-adjust the pixel brightness, prior to projection, so that the final image can be displayed with uniform brightness. The pixel brightness is pre-adjusted in color space according to a pre-determined map, say $G^{-1}$, similar to $F^{-1}$. This map only acts in the color space and no additional filtering is needed (i.e. only the pixel color values, not the pixel positions, are adjusted). As for $F^{-1}$, $G^{-1}$ can be determined from the brightness/luminosity transforming properties of the various optical elements and optical path. The electronic correction unit will apply $G^{-1}$ to each pixel's color value. A simple case is given by a linear function:

$$G^{-1}(O)=\alpha O+\beta,$$

where O is a RGB color value and the functional parameters $\alpha$ and $\beta$ are constant for every pixel.

The electronic correction of projection system 10 allows for a more flexible choice of optical lenses, since any associated distortions will be eliminated by pre-warping, rather than by matching the optical properties of the lenses. In particular, wide-angle lenses can be used, which can project the same sized image but at shorter projection distances, hence providing another variable in reducing the throw ratio. It should be noted however, that focus problems (as opposed to geometrical problems) cannot be corrected by geometric pre-distortion and still need to be addressed optically by appropriate choice of lenses.

The flexibility in lens types also extends to the types of mirrors that can be used. Prior art projection systems deal largely with planar reflection optics, since the distortions introduced by these mirrors can be eliminated by carefully arranging the various optical elements (e.g. see FIG. 2). In contrast, using a curved mirror for reflection results in a screen image that is distorted according to a combination of keystone and pincushion/barrel type effects and accordingly it is not possible to compensate for these types of distortions simply by selective arrangement of the optical elements. However, with the electronic geometric correction of projection system 10, these distortions can easily be eliminated. Referring back to FIG. 5, an example of a distorted screen image 40 that might arise due to reflection of a curved mirror and the corresponding pre-distorted image 42 that will serve to correct the geometric distortion is shown.

The benefit of using curved mirrors is that the throw ratio can be further reduced. In general, the angle subtended by two nearby rays reflecting of a curved mirror is greater than that for a planar mirror. This means that a curved mirror, placed at about the same distance from the projector as the plane mirror, leads to a greater image size (i.e. screen diagonal). Alternatively, a curved mirror placed closer to the projector can obtain the same image size, which implies a reduced projection distance and hence a smaller throw ratio. Practically this leads to a smaller cabinet size or space requirement to completely house the projection system (screen/mirrors/projector).

Figure 6:
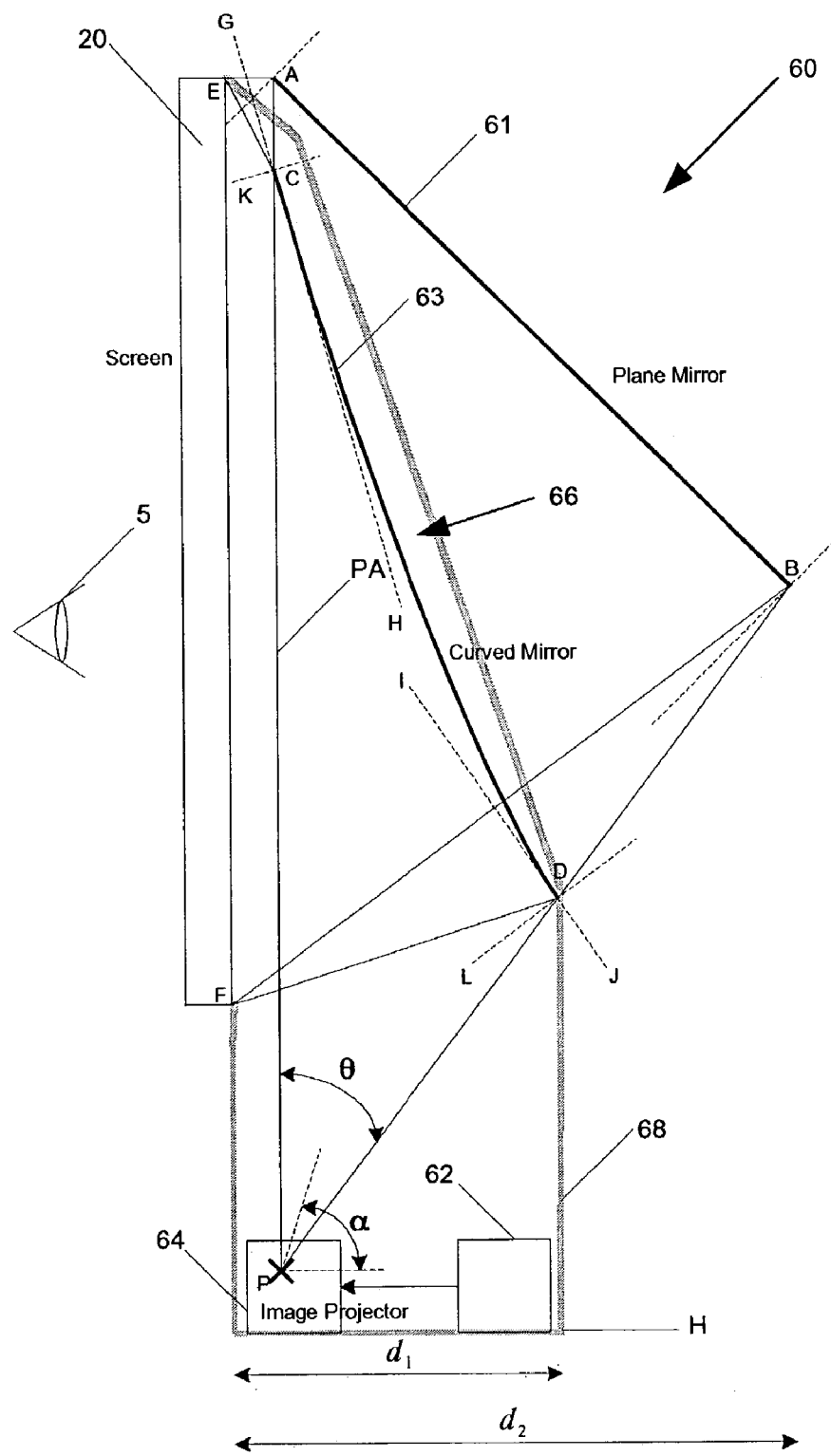
FIG. 6 is a side view of another example configuration of the projection system of FIG. 4 as a single fold rear projection system that uses a curved mirror.

FIG. 6 illustrates an example implementation of the projection system of the present invention as a rear projection configuration, namely projection system 60. Projection system 60 includes electronic correction unit 62, image projector 64 (with projector lens at P) and reflection optics 66 that includes a slightly curved mirror 63 (e.g. the convex type shown running from C to D) in single fold rear projection configuration. As shown, curved mirror 63 allows projection system 60 to achieve a lower throw ratio than that associated with a projection system that uses a conventional plane mirror 61 (running from A to B). It should be understood that other types of curved mirrors could be used within projection system 60 along with appropriately configured electronic correction units 62 to achieve similar throw ratios.

Image source (not shown) provides electronic correction unit 62 with input image data, which is then processed by electronic correction unit 62 until an appropriate pre-distorted image is generated. The pre-distorted image is then provided to image projector 64 (projector lens at P) which is oriented at an angle $\alpha$ from horizontal line H and which has an aperture angle of $\theta$. Without loss of generality, the upper ray PA is taken to be parallel to the screen (i.e. $\theta/2+\alpha=\pi/2$) and the lower ray PB is taken to be at angle $\theta$ from upper ray PA as shown. Pre-distorted image is reflected by reflection optics 66 onto projection screen 20 for viewing by viewer 5, as will be described.

Starting with the exemplary planar folded system (i.e. one that uses plane mirror 61 running from A to B), plane mirror 61 reflects the pre-distorted image onto projection screen 20 (running from E to F). The bottom ray PB is reflected at B onto F on projection screen 20, according to the law of reflection. Similarly, for the upper ray PA, the upper ray PA is reflected at A onto E on projection screen 20. In this manner all intermediate rays between upper ray PA and bottom ray PB, and hence the entire light beam, is mapped onto projection screen 20. As shown, projection depth for the planar system is given by $d_2$.

Assuming that the image projector parameters (i.e. position and angles) are fixed, the light pyramid (i.e. the light cone forming the image) emitted by the projector is fixed, the projection distance is conceptually decreased by moving points A and B, along rays PA and PB, towards P, to C and D, respectively. At this point, it is required that ray PC be reflected at C onto E, and that ray PD be reflected at D onto F. The dotted segments KC and LD bisect the angles PCE and PDF in half, and line segments GH and IJ are the corresponding orthogonal segments. A mirror between C and D must be tangential to GH at C and tangential to IJ at D, in order for the angles of incidence and reflection to be equal.

In general, the slopes of the tangents GH and IJ will differ, which implies that the mirror 63 at CD must be curved (in this particular case convex). In fact, for the given light pyramid and screen 20 arrangement shown in FIG. 6, a plane mirror 61 is only possible between points AB. By using reflection optics 66 that comprises curved mirror 63, the projection distance is reduced from $d_2$ to $d_1$, leading to a smaller throw ratio. The tangential slopes at C and D and the positions of C and D can be determined by the positioning/geometry of the screen/light pyramid for a particular projection and screen configuration. Once these vales are determined, a family of curved mirrors with the required properties can be precisely (mathematically) described, namely the cubic spline curves that interpolate points C and D with the required tangents.

As is conventionally known, the family of curves is obtained by varying the two internal control points without changing the end tangent lines (i.e. GH and IJ). This results in mirrors being used with different curvature properties, all of which satisfy the requirement that PC reflects at C onto E and PD reflects at D onto F. An optimal curve can be selected to ensure that an associated mirror can be feasibly constructed and to minimize any focus problems. Preferably, the curve is taken to be either convex or concave. Finally, a cabinet 68 is used to enclose the rear projection system of FIG. 6 having a smaller depth of $d_1$, and sufficient additional space to include other necessary components without obstructing the optics of projection system 10.

The above discussion has been based on a two dimensional curvature geometry. Specifically, it has been assumed that the mirror is curved only along its smaller dimension (i.e. along the plane of FIG. 6). It is contemplated that curvature could be introduced along the longer length (into transverse to the plane of FIG. 6) of the mirror. In order to do so, a more complicated three-dimensional analysis must be undertaken, although the steps are the same as discussed above in conjunction with the two-dimensional case. Instead of just considering merely the upper and lower rays PA and PB, reflection of the full light pyramid (enclosed by four rays (not shown)) needs to be considered. The four corner reflection points of the pyramid would be moved towards the projector 64 (at point P) to reduce the projection distance d.

These four points and the trapezoid they define, must then be reflected in a manner such that the area enclosed by the "trapezoid" (now curved because of reflection from a curved surface) in the plane of the screen fully encloses the screen (as shown in FIG. 5 where the trapezoid EFGH fully encloses the screen ABCD). This ensures that after electronic correction by electronic correction unit 12, the displayed image covers exactly the rectangular projection screen 20. If some parts of the projection screen 20 are not illuminated in the absence of correction, then no amount of electronic correction will be able to illuminate those areas. It should be understood that this requirement is also required for a mirror curved in only one direction. By knowing the positions and tangential planes (i.e. planes are needed in three-dimensions) for at least eight points on the reflecting trapezoid (say four corners and four midpoints), a set of curved mirrors can be precisely defined as a family of bi-cubic spline surfaces. These can be chosen to be convex or concave in order to produce minimum focusing problems.

Figure 7:
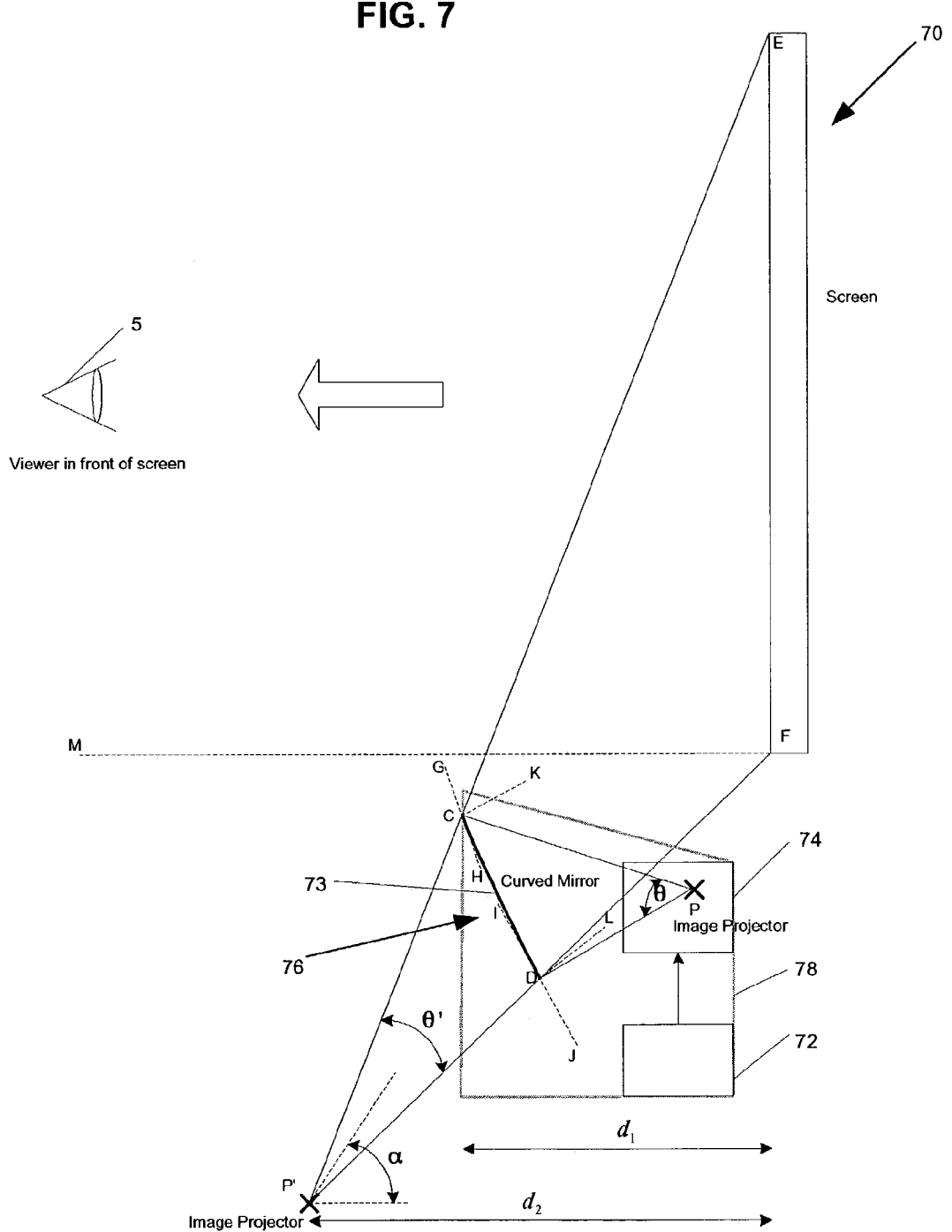
FIG. 7 is a side view of another example configuration of the projection system of FIG. 4 as a single fold front projection system that uses a curved mirror.

FIG. 7 illustrates another example implementation of the projection system of the present invention as a front projection assembly, namely projection system 70. Projection system 70 includes electronic correction unit 72, image projector 74 (projector lens at P) and reflection optics 76 that includes a slightly curved mirror 73 (e.g. the concave type shown running from C to D) in single fold front projection configuration. As shown, curved mirror 73 allows projection system 70 to achieve a lower throw ratio than would otherwise be achieved using a flat mirror in place of curved mirror 73, as will be described. It should be understood that other types of curved mirrors could be used within projection system 70 along with appropriately configured electronic correction units 72 to achieve similar throw ratios.

Without any reflection optics, a front projection system will consist simply of an image projector at projector position P'. One critical design constraint is that the projector must be placed below the line FM so that it does not obstruct the view of the viewer 5 in front of the screen. The orientation angle $\alpha$ and aperture angle $\theta'$ are chosen so as to minimize the projection distance $d_2$, while maintaining illumination of the complete projection screen 20. In general, a keystone correction will be required for the arrangement. The projection distance can be decreased by introducing a mirror 73 that runs from C to D (planar or curved) between the projector position P' and projection screen 20, and appropriately moving image projector 14 to the projector position P, as shown. The same steps discussed in relation to projection system 60 (FIG. 6) can be used to describe the curved (or planar) mirror in projection system 70. That is, by specifying the tangent slopes and positions at C and D it is possible to describe mirror 73 as a spline curve. Additionally, the projector position P can be varied to determine the best geometry. As before in respect of projection system 60, either concave or convex mirrors can be used with the appropriately configured electronic correction unit 12.

As shown in FIG. 7, reflection optics 76 comprises a converging concave mirror 73 (as seen by the rays coming from P). To obtain the same image size (screen diagonal) using a converging mirror, a wider-angle lens must be used (i.e. $\theta > \theta'$). This is an example of the flexibility in lens type that is possible through the use of appropriately configured electronic correction unit 12. As the aperture angle increases, optical distortions due to the lens will also increase, however these are compensated by electronic geometry pre-distortion within electronic correction unit 12. Using reflection optics 76, reduces the projection distance from $d_2$ to $d_1$, yielding a small overall enclosure size. The image projector 74 and reflection optics 76 can be housed in a small cabinet 78 as shown. As required, the entire apparatus is positioned below the FM line as required.

FIG. 7 serves as the basis for two compact front projection systems 80 and 90 as shown in FIGS. 8 and 9, respectively. Both projection systems 80 and 90 make use of a single convex mirror 83 and 93, respectively for image folding.

FIG. 8 illustrates another example implementation of the projection system of the present invention as a compact front projector, namely projection system 80. Projection system 80 includes electronic correction unit 82, image projector 84 and reflection optics 86 that includes a slightly curved mirror 83 (e.g. the convex type shown) in single fold front projection configuration. Projection system 80 is a desktop design, where cabinet 88 houses the electronic correction unit 82, the image projector 84 and reflection optics unit 86. The image source (not shown) is assumed to be external to projection system 80. Again, it should be understood that other types of curved mirrors could be used within projection system 80 along with appropriately configured electronic correction units 82.

The curved mirror reflection optics of reflection optics 86 allows the apparatus 80 to be close to projection screen 20 without obstructing viewer 5. Electronic correction unit 82 will correct any distortion or brightness non-uniformity digitally. Projection system 80 can be fine tuned by adjusting the angular orientation of mirror 83 and image projector 84, and appropriately adjusting the pre-distortion map within electronic correction unit 82.

Projection system 90 of FIG. 9 is a variation on projection system 80 (FIG. 8), where the image is projected from above projection screen 20 onto projection screen 20. Cabinet 98 is of a compact design placed close to or in the plane of screen 20, but above so as not to obstruct the view of viewer 5, and houses the electronic correction unit 92 and image projector 94. Reflection optics 96 comprises a curved mirror 93 that is located between screen 20 and viewer 5, again positioned so as not to obstruct the view using a support arm 97. Support arm 97 can be retracted, by means of a pivoting, telescoping, or similar mechanism, when the system is not in use, as is conventionally known. Support arm 97 also allows the angular orientation of mirror 93 to be adjusted for fine-tuning. In both systems, cabinet 98 can be extended to include the screen 20 (or arm 97) as is the case for the rear projection system 60 of FIG. 6.

Referring generally to FIGS. 6, 7, 8 and 9, the description of the curved mirrors utilized within each projection system has been in terms of spline curves/surfaces, defined by a set of tangent lines/planes and positions at/of certain points (which are commonly referred to as control points). This is a very general description of a curved mirror, however, it should be understood that more specific types of curved mirrors can be used. These are mirrors/surfaces with well known reflection properties, such as spherical, elliptical, hyperbolic and parabolic surfaces. The choice of the type of mirror depends on the optical properties of the mirror and the projection lens unit. That is, both components have to be matched in the sense that the screen image be focused. As for any curved surface, if the curvature is too large or incorrectly chosen, then focus problems can arise. In some cases, the ideal curved mirror might be an intermediate type (partly elliptical or elliptical in one direction and so forth).

Figure 10A:
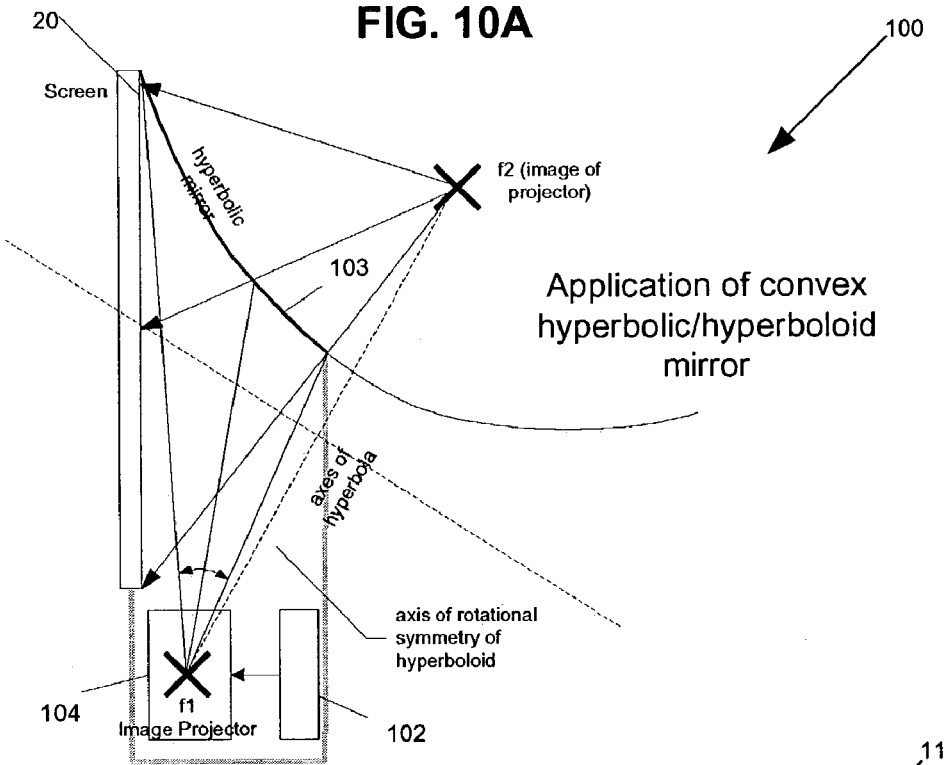
FIGS. 10A and 10B are schematic diagrams of other example configurations of the projection system of FIG. 4 which use concave and convex hyperbolic/hyperboloid mirrors to fold the optical path.
Figure 10B:
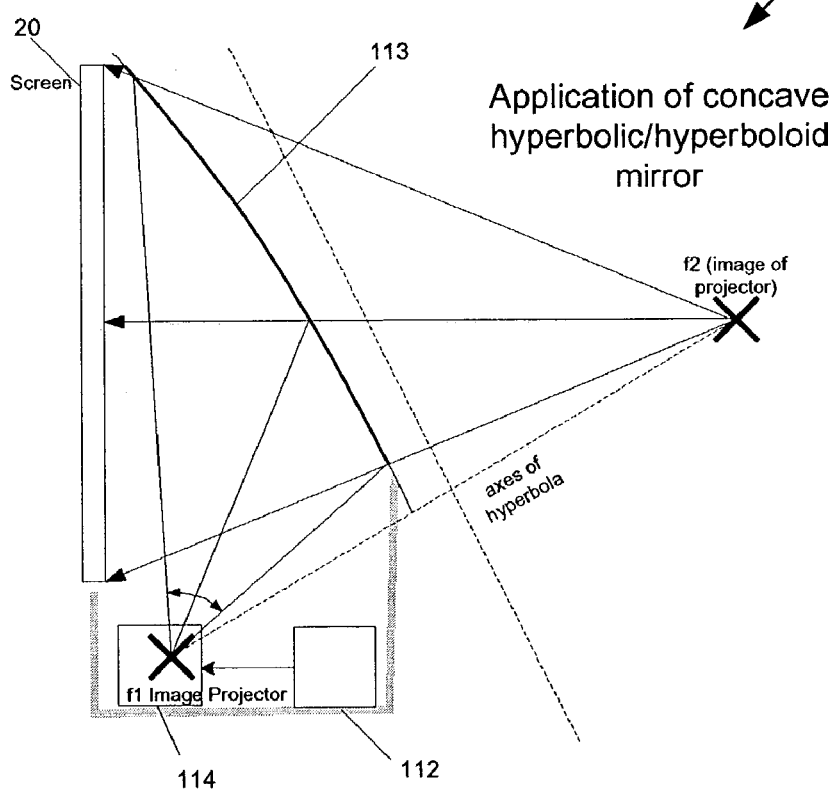

Specifically, FIG. 10 illustrates the use of hyperbolic/hyperboloid mirrors in folding the optical path within projection system 100 and 110. Hyperbolic curves have the property that rays coming form one focal point of the hyperbola are reflected as if they were emitted from the other focal point. Projection system 100 illustrates how image projector 104 may be placed at the focal point f1 of the hyperbola (the axis of the hyperbola is shown in dotted lines). The second focal point is at f2. The convex curved component of the hyperbola (as seen from f1) is used for the curved mirror 103. Rays from f1 reflect off the mirror 103 as if they were emitted from focal point f2, which forms the image of the (image) projector. For the three-dimensional situation (mirror curved in both directions), the hyperbolic curve is replaced by a hyperboloid surface, yet the reflection properties remain unchanged.

Projection system 110 includes a concave curved component for mirror 113 (which sits on the same side of the "vertical" axis as the focal point f1). Again, the rays reflect as if they were emitted from focal point f2. Since the concave mirror 113 is a converging mirror, this requires a wide-angle lens for the image projector 114. It should be noted that cabinet size is increased (larger projection distance) though the distortion that has to be corrected is less severe (any focus issues will also be reduced) producing a processing vs. size tradeoff. This can be seen from the orientations of rays projected onto the screen, which are more in line with those of the prior art projection system of FIG. 2, where a planar folding mirror is used.

FIG. 11 shows a two-fold rear projection system 120 that uses two hyperbolic mirrors 121 and 123, namely a concave and a convex mirror in sequence. As discussed, the reflection optics of any system, rear based or front based, is not restricted to be of a single mirror type. Image projector 124 is placed at focal point f1 of the first mirror 121, where the mirror 121 is taken to be the diverging convex part of the hyperbola. This serves to expand the image and hence the image projector 124 and mirror 121 combination effectively functions as a wide-angle lens. The focal point f2 of the first mirror 121 also matches the focal point of the second mirror 123, which is taken to be the converging concave part of the second hyperbola. The rays reflecting of the second mirror 123 appear as if they were emitted from the second focal point, f3, of that mirror 123. The converging second mirror 123 results in reduced distortion whereas the first diverging mirror 121 allows the use of a normal lens to mimic a wide-angle lens. Similarly, any of the previously discussed systems can incorporate a second curved mirror as part of their reflection optics.

FIG. 12 shows another example projection system 130 in which the light beam from a single projector 134 is split into two optical paths, with each half beam reflecting separately to illuminate half of the screen. The reflection optics 136 comprises two sets of self-reflecting planar mirrors 131 and 135 and 133 and 137 as shown. Further variations can be obtained by using multiple mirrors (more than two) and/or more than one image projector unit. Multiple mirrors and/or projectors can be used to divide/split the optical path and associated reflection optics into several subunits, which illuminate different parts of the screen.

In FIG. 12, each pair of mirrors 131, 135 and 133, 137 form an independent two-fold reflection optics unit, illuminating one-half of the screen. The first two mirrors 135 and 137 serve also to split the light beam (light pyramid) into two paths, which then reflect off of the second two mirrors 131 and 133 onto the screen. This effectively reduces the aperture angle seen by the left and right mirror pairs, which leads to smaller sizes for the mirrors while maintaining a small throw ratio. The electronic correction unit has to appropriately correct the left and right halves, such that the proper image is reconstructed on the screen. This can mean forming two disjoint sub-images from the original signal and independently pre-distorting them. The images projected, or screen portions illuminated, by each optical path can be overlapping near the center (point C in FIG. 12). In this overlap band the luminance level would be greater and would require some form of edge blending or softening to be applied by electronic correction unit 132 in order to achieve a seamless image over the entire screen. A simple edge blending implementation would be to define an overlapping band within the pre-distorted sub-images such that when projected on the screen these bands are of equal width. Further, the luminance levels in the sub-image overlap bands should be attenuated in a complementary linear gradient so that the sum of the sub-image luminance levels is constant.

FIG. 13 provides another example projection system 140 that uses two image projectors, which form half of the image, rather than splitting the image/beam optically. Curved mirrors 141, 145 and 143, 147 are used to reduce the projection distance. This arrangement can be viewed as concatenating two rear projection systems. That is, the light pyramid is split by making use of two image projectors 144 and 144', each projecting one half of the original signal. Two sets of diverging convex mirrors 141 and 145 and 143 and 147, one set for each optical path, are used to further reduce the throw ratio. Each image projector 144 and 144' can have a separate electronic correction unit 142 or a single unit can be shared. The two sub-images are independently distorted and/or edge adjusted by the electronic correction unit 12, such that the final image appears undistorted, seamless and as close as possible to the image source signal.

Whenever angled, curved mirrors are used, it is possible that focus problems will arise due to astigmatism in the optical path. In short, light from different parts of the outer regions of the image projector lens will focus at different distances. If these focal distances vary significantly, then it becomes difficult to achieve good focus. To overcome this, an additional shape constraint can be placed on the mirror to limit any astigmatism. In the above spline-based construction of curved mirrors, the control points can be adjusted, without breaking the edge requirements (of specific tangent slopes and positions), in order to control the curvature along the surface. This allows the mirror shape to be varied in a manner such that astigmatism is minimized. In particular, limiting cases can be specified, between which the amount of astigmatism is acceptable. Another approach is to add complementary astigmatism to the projection optics of the image projector. It is possible to add one or more cylindrical lens elements to the projection optics, thus producing a uniform and known degree of astigmatism across the entire field. The curved mirror can then be designed to uniformly invert this astigmatism, within tolerance, across its entire field. This adds an extra degree of freedom in the design— the amount of astigmatism in the projection optics, which can be varied to optimize the mirror shape and the optical performance of the entire system.

It should be understood that without the general electronic geometry correction achieved by electronic correction unit 12, projection system 10 must be designed to ensure that the overall image distortion is acceptable. Such design constraints can be problematic, due to distorting effects of the curved mirror, the off-axis projection (keystone effects), and possibly cylindrical lens elements. The present invention's use of electronic correction allows for geometric distortion (as well as brightness non-uniformity) to be eliminated from the design constraints for a projection system and instead these prior limitations can be considered to be a design "degree of freedom". Accordingly, the image distortion of the optical path can be freely modified in order to improve astigmatism and other aberrations. Further, digital correction (via pre-distortion) of the input signal can be used to compensate for this, and thus an undistorted image can be produced on the viewing screen.

For illustrative purposes, an example of such an optimization is now described in the context of reflection from a convex screen. The resulting image, without any correction, will display a pincushion plus keystone distortion (see EFGH in FIG. 5). It is known that the inverse of a pincushion distortion is a barrel distortion (see IJKL in FIG. 5, which also has a vertical keystone component)—by pre-distorting according to a barrel distortion, the pincushion distortion can be reduced or eliminated. Thus another possibility of eliminating the distortion from a convex curved mirror is to add a barrel distortion by using a wide-angle lens. By closely matching the two complementary effects, distortions due to the "curving" behavior of the mirror/wide-angle lens combination can be reduced, leaving the electronic correction unit to compensate primarily for the off-axis projection/keystone effect.

Accordingly, projection system 10 incorporates a general short throw optical system that has inherited distortion while achieving the short throw distance with an electronic correction circuit that corrects for geometric and other optical distortions. Electronic correction unit 12 eliminates the residual optical distortion that occurs within prior art systems by applying the inverse distortion to the input image data to compensate for such optical distortion. Electronic correction unit 12 also has the ability to correct display anomalies associated with manufacturing variances while simultaneously providing conventional display processing functionality such as image processing and scaling. Electronic correction unit 12 also uses digital image processing to compensate for optical anomalies related to large variations in optical path within the optical envelope and other optical component anomalies (e.g. light source, display devices, lenses, etc.) that result in uneven luminance and uneven chrominance.

Projection system 10 may use a curved mirror with an optically correct or incorrect projection lens, or a planar or curved mirror with a wide-angle projection lens, to achieve the short throw ratio. The electronic correction unit serves to eliminate any geometric distortions including lateral chromatic aberration and correct for brightness or luminance non-uniformity, which in prior art methods are dealt with optically. The system design is no longer limited by the constraint of minimizing distortions optically. This also has the added benefit of being able to apply any fine-tuning digitally rather than the more complicated optical means. Variations can be obtained by combining several mirrors (planar and/or non-planar) and/or image projectors. The system is applicable to both front and rear projection setups. Specific front and rear projection systems with short throw ratios are disclosed.

As will be apparent to those skilled in the art, various modifications and adaptations of the structure described above are possible without departing from the present invention, the scope of which is defined in the appended claims.

The invention claimed is:

1. A projection system for displaying a distortion corrected optical image on a projection screen based on input image data, comprising:
   (a) an electronic correction unit for receiving the input image data and generating pre-distorted image data;
   (b) an image projector coupled to the electronic correction unit for receiving the pre-distorted image data and providing an pre-distorted optical image that corresponds to the pre-distorted image data;
   (c) said electronic correction unit being adapted to pre-distort the geometry of the input image data such that when said pre-distorted optical image based on said pre-distorted image data provided through the image projector, the optical, geometric, and alignment distortions associated with said image projector are eliminated in the displayed optical image; and,
   (d) said electronic correction unit being further adapted to independently pre-distort the geometry of each primary color represented by the input image data and generate a pre-distorted primary color image data to compensate for differences in the optical refraction of each color, such that when the pre-distorted primary color image associated with the pre-distorted primary color image data is projected through the image projector to the projection screen, the optical and geometric distortions associated with each primary color optical image are eliminated.

2. The projection system of claim 1, further comprising a display device associated with the image projector, wherein the electronic correction unit also modifies the image brightness associated with said input image data such that brightness variations due to characteristics of the optical components, projection path and the display device are compensated for.

3. The projection system of claim 1, further including a reflection assembly that includes at least one of a planar and a curved mirror, said optical reflection assembly being positioned in the optical path of the pre-distorted optical image to produce a displayed optical image for projection on the projection screen, said electronic correction unit being further adapted to correct for the distortions introduced by said reflection assembly.

4. The projection system of claim 3, wherein said image projector comprises:
   (i) a light generator for generating a collimated beam of light;
   (ii) a color separator coupled to the light generator that separates the light beam into separated primary color light streams that correspond to those represented in the pre-distorted primary color image data;
   (iii) a display device positioned in front of the light separator for modulating the separated primary color light streams with the pre-distorted primary color image data; and
   (iv) an optical assembly positioned in front of the display device for projecting and focusing the pre-distorted optical image onto the projection screen.

5. The projection system of claim 4, wherein said light generator is selected from the group consisting of a lamp and a laser, said display device is a micro-display, and said optical assembly is an array of lenses.

6. The projection system of claim 4, further comprising a plurality of display devices, wherein said light separator directs separated primary color light streams to said plurality of display devices, each display device being adapted to concurrently modulate each one of the primary color light streams with corresponding primary color image data and wherein said optical assembly is further adapted to direct and focus all primary color optical images to a composite color optical image.

7. The projection system of claim 4, where the optical assembly of said image projector contains astigmatic elements designed to at least partially compensate for focus astigmatism in the optical path of said pre-distorted optical image.

8. The projection system of claim 4, where the optical assembly of said image projector contains wide angle lenses having at least one of uncorrected optical distortion and lateral chromatic aberration.

9. The projection system of claim 3, wherein said reflection assembly comprises at least one curved mirror adapted to substantially correct for at least one of optical and geometric distortion and a planar mirror wherein the reflective surfaces of the at least one curved mirror and planar mirror is placed within the optical path of the pre-distorted optical image.

10. The projection system of claim 3, wherein said reflection assembly comprises a convex mirror wherein the convex reflective surface is placed within the optical path of the pre-distorted optical image.

11. The projection system of claim 3, wherein said reflection assembly comprises a concave mirror wherein the concave reflective surface is placed within the optical path of the pre-distorted optical image.

12. The projection system of claim 3, wherein said at least one curved mirror of said reflection assembly comprises a hyperbolic/hyperboloid mirror.

13. The projection system of claim 3, wherein said reflection assembly comprises a first curved mirror and a second curved mirror, such that the optical path of the pre-distorted optical image is reflected from the surface of said first curved mirror onto the surface of said second curved mirror.

14. The projection system of claim 13, wherein said first mirror is a convex mirror and said second mirror is concave mirror, such that the optical path of the pre-distorted optical image is reflected from the convex surface of said first curved mirror onto the concave surface of said second curved mirror.

15. The projection system of claim 3, wherein said reflection assembly comprises at least one curved mirror and at least one planar mirror to reduce the optical envelope.

16. The projection system of claim 3, wherein said electronic correction unit and projection unit, and reflection assembly are adapted to operate in a front projection configuration.

17. The projection system of claim 3, wherein said electronic correction unit and projection unit, and reflection assembly are adapted to operate in a rear projection configuration.

18. The projection system of claim 3, wherein the pre-distorted optical image is split into at least two optical paths where at least one mirror of said reflection assembly is positioned in each of at least two optical paths such that each optical path contains a different portion of the displayed optical image, each of which illuminates a different portion of the projection screen.

19. The projection system of claim 1 in combination with at least one other projection system of claim 1, wherein each projection system displays a different portion of the optical image on the projection screen.

20. The projection system of claim 18 or 19, wherein said different portions of the optical image displayed on the projection screen are slightly overlapping and where the electronic correction unit uses edge softening in respect of the displayed optical images in order to reduce or eliminate visible seams therein.

21. The projection system of claim 1, wherein said projection system includes a pivoting assembly for retracting said optical assembly towards the plane of the projection screen to reduce obstruction in front of the projection screen.

22. A projection method for displaying a distortion corrected optical image on a projection screen based on input image data, comprising:
 (a) receiving input image data and generating pre-distorted image data;
 (b) providing a pre-distorted optical image through an image projector, said pre-distorted optical image corresponding to the pre-distorted image data;
 (c) wherein (a) further consists of pre-distorting the geometry of the input image data such that when said pre-distorted optical image based on said pre-distorted image data is provided through the image projector, the optical, geometric, and alignment distortions associated with the image projector and the reflection assembly are eliminated in the displayed optical image; and
 (d) independently pre-distorting the geometry of each primary color represented by the input image data to compensate for difference in optical refraction of each color, such that when the pre-distorted primary color image associated with the pre-distorted primary color image data is projected through the image projector to the projection screen, the optical and geometric distortions associated with each primary color optical image are eliminated.

23. The method of claim 22, further comprising modifying the image brightness associated with said input image data such that optical brightness variations due to characteristics of the optical components, optical path, and the display device are compensated for.

24. The method of claim 22, further comprising reflecting the pre-distorted optical image in a reflection assembly comprising at least one of a planar mirror and a curved mirror to produce a displayed optical image for projection on the projection screen, further comprising pre-distorting the optical image to eliminate distortions caused by the reflecting.

25. The method of claim 24, where (b) further comprises generating a collimated beam of light, separating the light beam into primary color light streams, positioning a display device for modulating the pre-distorted primary color image data, and projecting and focusing the pre-distorted optical image onto the projection screen.

26. The method of claim 25, where each of the primary colors separated light streams are directed to a separate display device, each display device being adapted to concurrently modulate each one of the primary color light streams with corresponding primary color image data and to direct and focus each primary color optical images into a composite color optical image.

27. The method of claim 24, further comprising providing a wide angle lens having at least one of uncorrected optical distortion and lateral chromatic aberration within the path of the pre-distorted optical image.

28. The method of claim 24, further comprising reflecting said pre-distorted optical image in the surface of a convex mirror.

29. The method of claim 24, further comprising reflecting said pre-distorted optical image in the surface of a concave mirror.

30. The method of claim 24, further comprising reflecting said pre-distorted optical image in the surface of a hyperbolic/hyperboloid mirror.

31. The method of claim 24, further comprising reflecting said pre-distorted optical image sequentially from the surface of a first curved mirror onto the surface of a second curved mirror.

32. The method of claim 24, further comprising comprises reflecting said pre-distorted optical image sequentially from the surface of at least one of a curved mirror that substantially corrects for at least one of optical and geometric distortion and a planar mirror onto the surface of the other of a curved mirror and a planar mirror to reduce the optical envelope.

33. The method of claim 24, wherein said first mirror is a convex mirror and said second mirror is concave mirror.

34. The method of claim 24, further comprising retracting the optical assembly towards the plane of the projection screen to reduce obstruction in front of the projection screen.

35. The method of claim 24, further comprising splitting the pre-distorted optical image into at least two optical paths where at least one mirror of said reflection assembly is positioned in each at least two optical paths such that each optical path contains a different portion of the displayed optical image, each of which illuminates a different portion of the projection screen.

36. The method of claim 22, further comprising providing astigmatic elements within the path of the pre-distorted optical image to compensate for focus astigmatism effects.

37. The method of claim 22, wherein the projection system is operated in a front projection configuration.

38. The method of claim 22, wherein the projection system is operated in a rear projection configuration.

39. The method of claim 38 or 34, further comprising edge softening the different portions of the displayed optical image to reduce or eliminate visible seams therein.

40. The method of claim 22 implemented by at least two separate projector systems, each projector systems implementing the method of claim 22 to display a different portion of the optical image on the projection screen.

* * * * *